UNITED STATES PATENT OFFICE.

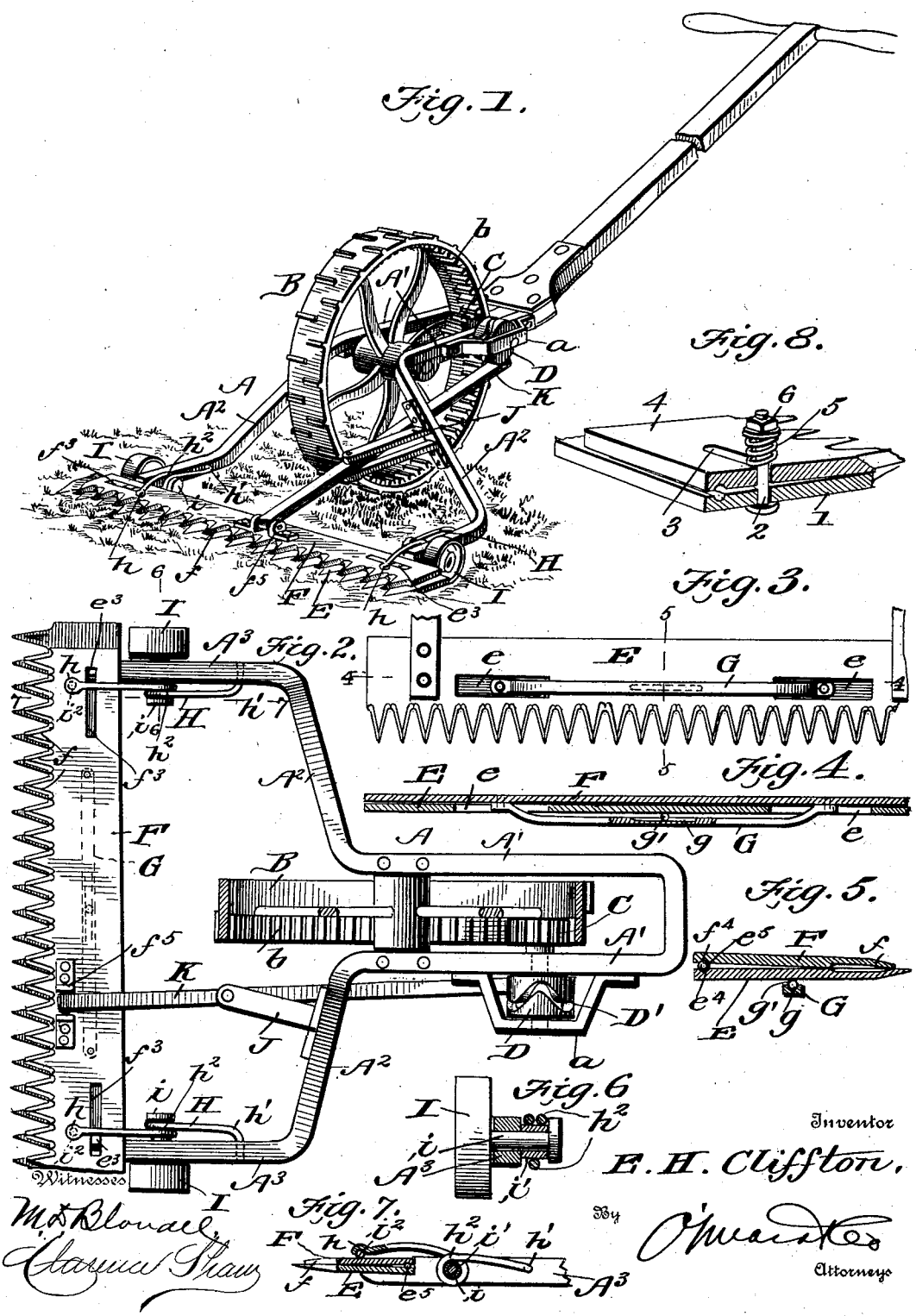

EUGENE H. CLIFFTON, OF LANSDALE, PENNSYLVANIA.

LAWN-MOWER.

SPECIFICATION forming part of Letters Patent No. 700,173, dated May 20, 1902.

Application filed August 17, 1901. Serial No. 72,360. (No model.)

*To all whom it may concern:*

Be it known that I, EUGENE H. CLIFFTON, a citizen of the United States, residing at Lansdale, in the county of Montgomery and State of Pennsylvania, have invented a new and useful Improvement in Lawn-Mowers, of which the following is a specification.

My invention is an improvement in mowers, and more particularly lawn-mowers, and has for its object to provide an arrangement for securely holding the blades in position and at the same time to take up the wear that is necessarily caused by the blades rubbing.

With this object in view my invention has also for its object the provision of an arrangement whereby the friction of the blades and attachment are reduced to a minimum; and a still further object is to so arrange the parts that the cut grass in passing over the cutter-bar will in no wise be obstructed, thus enabling the machine to be positive in its operation; and with these objects in view my invention also consists in the peculiar and novel arrangement and combination of parts, as will be fully described in the following specification and pointed out in the claims, reference being had to the drawings, in which—

Figure 1 is a perspective view of a machine constructed in accordance with my improvement. Fig. 2 is a section plan of the same, the handle being broken away. Fig. 3 is an inverted plan view of the finger-bar. Fig. 4 is a section of the same on about line 4 4 of Fig. 3. Fig. 5 is a detail cross-sectional view on about the line 5 5 of Fig. 3. Fig. 6 is a sectional elevation of one of the front supporting-wheels, the view being taken on about line 6 6 of Fig. 2. Fig. 7 is a detail section on the line 7 7 of Fig. 2, and Fig. 8 is a detail view illustrating a modified construction.

In constructing a mower with my improvements I provide a main frame A, which is preferably of one piece of metal bent at the middle to provide parallel sections A' A', the forward portions being bent downwardly and outwardly, as shown at $A^2$ $A^2$, the extreme ends finally terminating in horizontally-parallel members $A^3$ $A^3$. In the horizontal sections A' is journaled the main drive-wheel B, whose rim is provided upon the inner side with rack-teeth $b$, into which meshes a pinion C, whose shaft is journaled in one of the sections A', and upon the outer end of the shaft is mounted a cam-wheel D, having a groove D' arranged therein. This shaft is further strengthened by a bracket $a$, arranged upon the exterior of the section A', and between the bracket and the parallel section of the frame the cam-wheel is located.

To the front of the horizontal parallel members $A^3$ of the frame is securely fastened the finger-bar E of the cutter, having short longitudinal slots $e$ $e$, as shown most clearly in Figs. 3 and 4 of the drawings. Positioned upon the upper surface of the finger-bar E is the cutter-bar proper, F, having the usual fingers $f$, as shown. The manner of securing these two sections together forms an important feature of my invention, and while I have shown two separate fastenings I desire it understood that either may be used independently of the other, although I prefer to use both in order to secure a more positive holder, and these springs are arranged as follows: To the under side of the cutter-bar F is secured by screws the ends of a flat spring-bar G, the said ends protruding through the slots $e$, formed in the lower or finger bar E, and is adapted to bear against the latter to hold the bars together, and in order to reduce the friction between the spring and lower bar I provide the latter with a longitudinal recess $g$, in which is adapted to play a steel ball $g'$. It will be understood that the bar G travels with the cutter-bar, and by providing the ball-bearing the friction between the said bar and spring is reduced to a minimum. Suitably held to the frame A are coiled springs H, which bear at the forward ends $h$ against the upper surface of the cutter-bar, while their rear ends $h'$ terminate in angular-bent portions which are held in recesses formed in the said frame. These springs are preferably held upon the axles $i$ of the front or supporting wheels I, and in order that the wheels may be tightly and firmly positioned I prefer to form the inner portions of the axle with a sleeve $i'$, around which the coil $h^2$ of the springs is held and which forms the tension of the said springs. The forward ends $h$ of the springs are enlarged and socketed to hold a ball $i^2$ for the purpose of reducing friction, as will be understood. The cutter-bar F is also provided with short longitudinal slots $f^3$, in which fit lugs $e^3$, carried by the lower bar, and by which the bars are held in a true position.

In order to reduce the friction between the bars E and F, I arrange in their abutting faces, and preferably at their rear edges, grooves $e^4$ and $f^4$, in which are adapted to operate balls $e^5$, and it will be seen by this arrangement the rear portions of the said bars are separated, leaving only the front cutting surfaces or fingers to lie flat against each other, and I may state here that the inner faces of the fingers are concaved, so as to provide a better cutting edge, as shown in Fig. 5.

In order to oscillate the upper or cutter bar I arrange upon the front of one of the downwardly and forwardly projecting portions of the frame A bracket-arms J, in which is pivoted a lever K, whose forward end is loosely held in a bracket $f^5$, carried by the cutter-bar. The rear end of the lever is provided with a pin, over which is positioned a sleeve or roller that is designed to work in the groove formed in the wheel D. It will thus be seen that as the machine is pushed forward the pinion C is revolved, and through the medium of the cam-wheel D and lever K motion is imparted to the cutter-bar. In practice I may find it desirable to provide the pinion with a ratchet, so that the machine may be moved backwardly without causing the cutter to operate; but as the handle of the machine may be easily tilted downwardly to elevate the cutter it may be propelled without cutting the grass, and therefore the use of the said ratchet is optional.

In Fig. 8 I have shown a modified arrangement of spring-clamp in which the finger-bar I has a bolt 2 or series of them projecting upwardly therefrom and protruding through the slot or slots 3, formed in the cutter-bar 4, and upon the upper end of the bolt is positioned a spring 5, which bears against a tension-nut 6 and the top of the cutter. It will thus be seen by this construction that an equally effective device may be secured, although I prefer the construction and arrangement first described.

Having thus fully described my invention, what I claim as new, and desire to secure by Letters Patent, is—

1. In a mowing-machine the combination of a frame having a drive-wheel held thereon, a finger-bar held on the forward portion of the frame, a cutter-bar positioned thereon, springs held on the frame and adapted for engagement with the cutter-bar, a spring-bar carried by the cutter-bar and adapted for engagement with the finger-bar, balls interposed between the said springs and bars, substantially as shown and described.

2. In a cutter apparatus for mowing-machines, the combination of a finger-bar having slots arranged therein, a cutter-bar arranged upon the finger-bar, a flat spring having its ends protruding through the slots in the said finger-bar and having a recess arranged in its upper face, and an antifriction-ball held in the said recess and adapted to bear against the said finger-bar whereby the said bars are held together, substantially as shown and described.

3. In a mowing-machine, the combination of a frame having a finger-bar secured thereto, of a cutting-bar held upon the said finger-bar, springs carried by the said frame and having their forward ends enlarged and recessed, antifriction-balls held in the said recesses and adapted to bear against the said cutter-bar, the said cutter-bar having slots adapted to receive studs arranged on the said finger-bar and means carried by the said frame for operating the cutter-bar, substantially as shown and described.

4. In a mowing-machine, the combination of a frame, a drive-wheel journaled therein, supporting-wheels journaled in the said frame, a cutting device arranged on the said frame in advance of the said supporting-wheels, springs held upon the journals of the supporting-wheels, and having one end engaging the cutting device, and the opposite ends engaging the frame, substantially as shown and described.

5. In a mowing-machine, the combination of a frame, having a bracket held thereon, a drive-wheel having gear-teeth journaled in the said frame, a shaft carrying a sprocket-wheel and cam-wheel journaled in the said frame and bracket, supporting-wheels journaled on the said frame, a finger-bar arranged on the said frame in advance of the said supporting-wheels, the said bar having longitudinal slots arranged therein, a cutting-bar having a spring-bar held thereto, the ends thereof protruding through the said slots, an antifriction-ball interposed between the said spring-bar and finger-bar, the said cutting-bar also having slots adapted to receive studs carried by the said finger-bar, springs coiled upon the journals of the said supporting-wheels, each having one end held to the frame, the opposite end thereof having a socket formed therein and adapted to hold an antifriction-ball, the said balls engaging the cutting-bar, and a lever held in a bracket carried by the frame, and adapted for engagement with the said cam-wheel and cutting-bar, substantially as shown and described.

6. In a cutting device for mowing-machines, the combination of a finger-bar and cutter-bar, each having a recess formed in their contiguous surfaces and near their rear edges, antifriction-balls held in the said recesses and of such size as to separate the said bars at the rear edges and throw the opposite edges into contact, substantially as shown and for the purposes specified.

EUGENE H. CLIFFTON.

Witnesses:
A. D. JOHNSON,
MAZIE JOHNSON.